United States Patent [19]
Riegel et al.

[11] 3,842,864
[45] Oct. 22, 1974

[54] STOPPING APPARATUS FOR PIPE LINES

[75] Inventors: Peter S. Riegel; Ronald Legue, both of Columbus; Leslie F. Nikodem, Grove City; Willard Slay, Worthington, all of Ohio

[73] Assignee: American Gas Association, Inc., Arlington, Va.

[22] Filed: Mar. 23, 1973

[21] Appl. No.: 344,235

Related U.S. Application Data

[63] Continuation of Ser. No. 193,662, Oct. 29, 1971, abandoned.

[52] U.S. Cl..................................... 138/93, 138/94
[51] Int. Cl............................................. F16l 55/12
[58] Field of Search............... 138/90, 93, 94, 97, 98

[56] References Cited
UNITED STATES PATENTS

| | | | |
|---|---|---|---|
| 1,833,700 | 11/1931 | Wolf..................................... | 137/317 |
| 1,860,855 | 5/1932 | Gardner................................ | 138/93 |
| 3,442,539 | 5/1969 | Randall................................. | 285/90 |
| 3,498,333 | 3/1970 | Jones.................................... | 138/93 |

Primary Examiner—Charles A. Ruehl
Attorney, Agent, or Firm—Howson & Howson

[57] ABSTRACT

An inflatable-bag type line-stopper for use with the valving assembly of a conventional pipe-tapping machine to block flow through a pipe comprises an upstanding housing which mounts on the valving assembly and which contains a bag-insertion assembly capable of being extended and retracted with respect to the housing for inserting and withdrawing the bag. The bag is normally contained in an insertion tube and is connected by a knuckle assembly to a plunger which is slidably mounted in the tube. The knuckle assembly permits the bag to turn in the proper direction in the pipe during insertion and withdrawal. Handles are provided on operating rods connected to the plunger and the insertion tube for extending and retracting the bag. Compressed air at a pressure greater than line pressure is supplied to the bag through another valving assembly mounted on the plunger operating-rod and a passage in the knuckle assembly. A jacking assembly is provided to cooperate with the operating rods to enable the bag to be withdrawn from the pipe with a minimum of effort. The handles and operating rods are capable of being disconnected from their associated operating elements to permit the line-stopper to be arranged in a compact configuration for storage.

16 Claims, 11 Drawing Figures

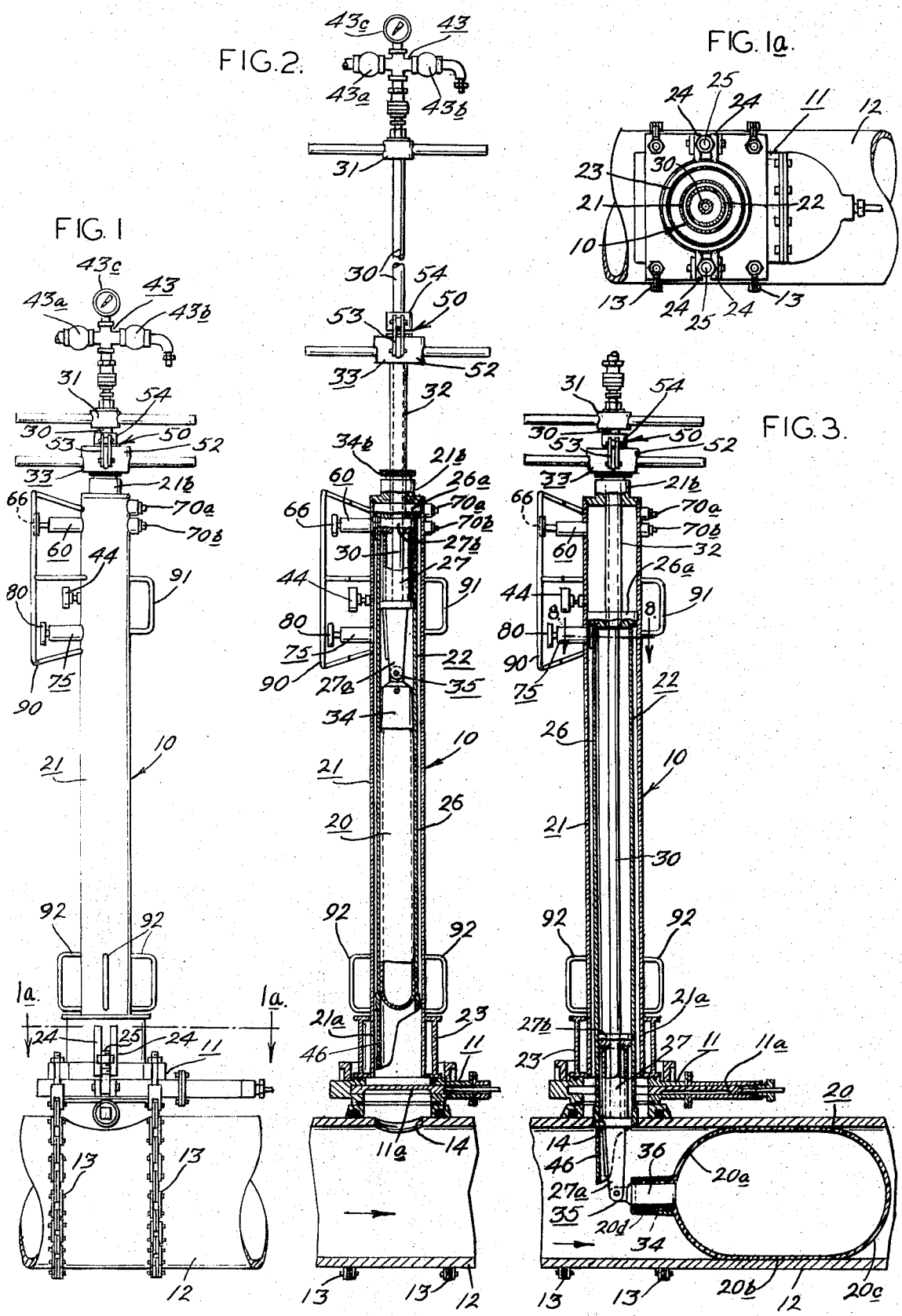

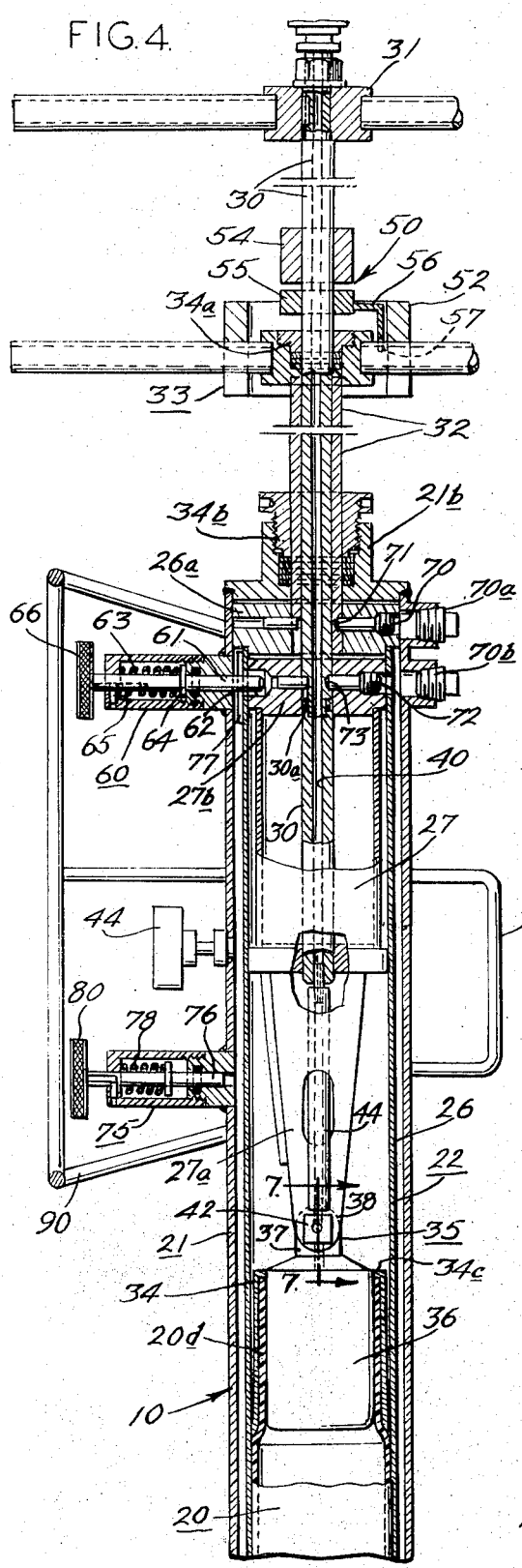
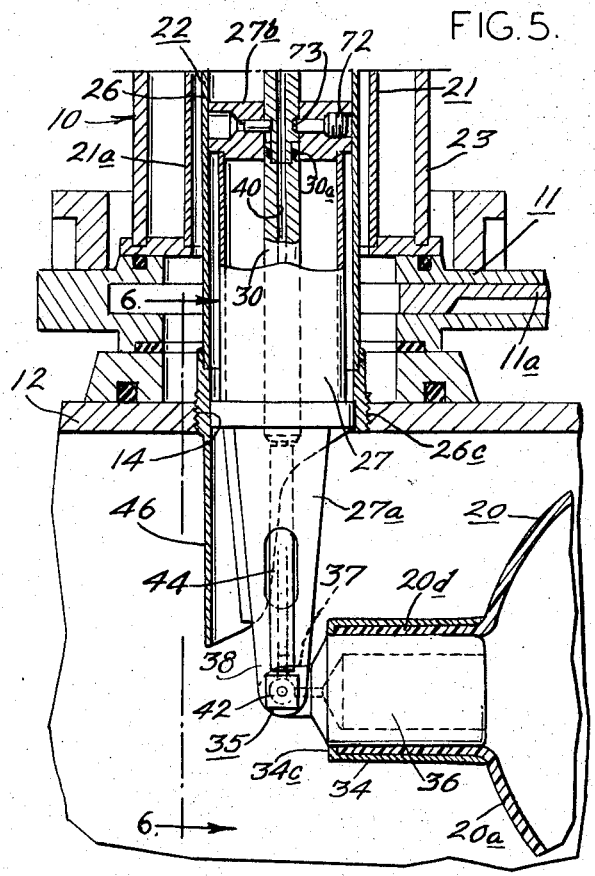
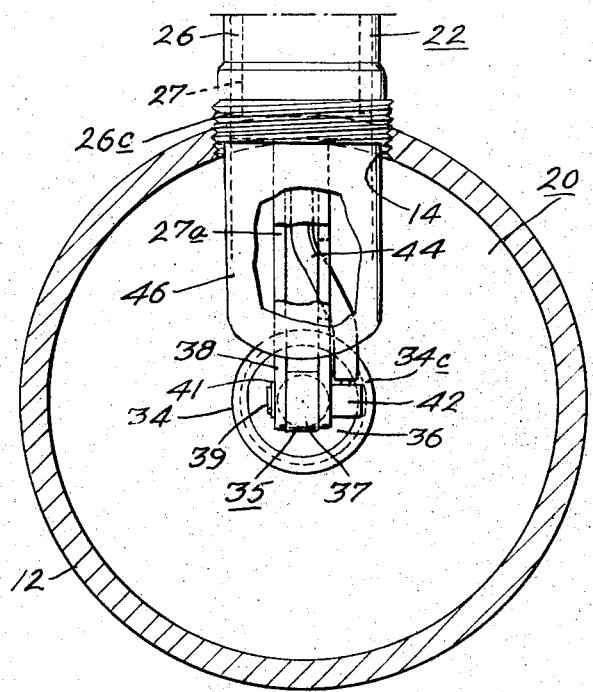

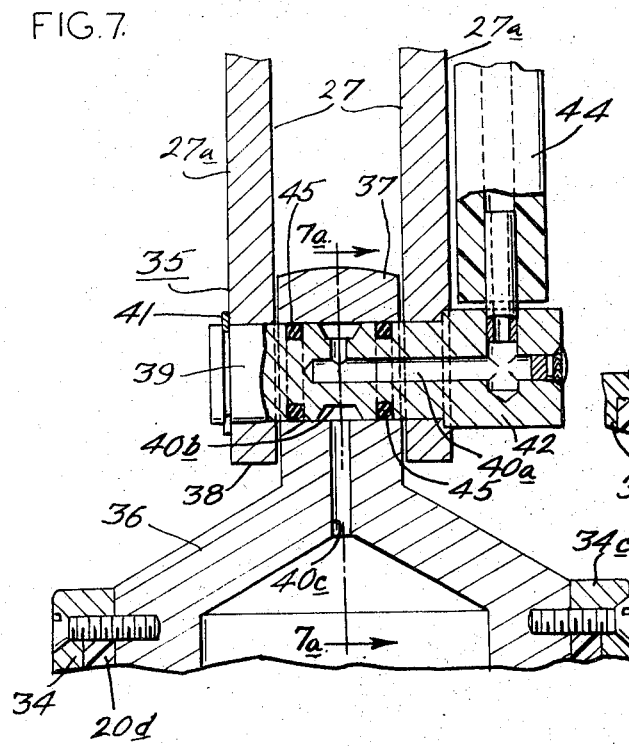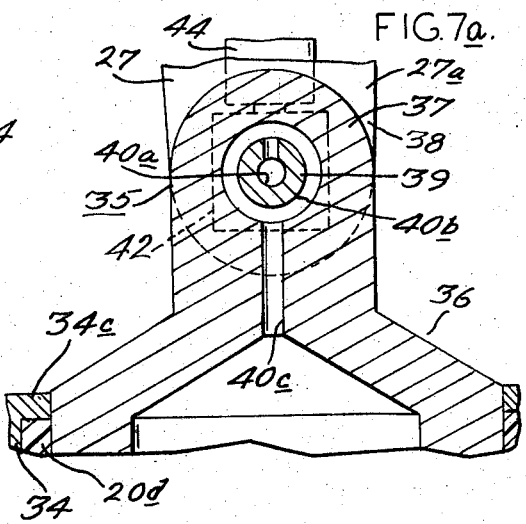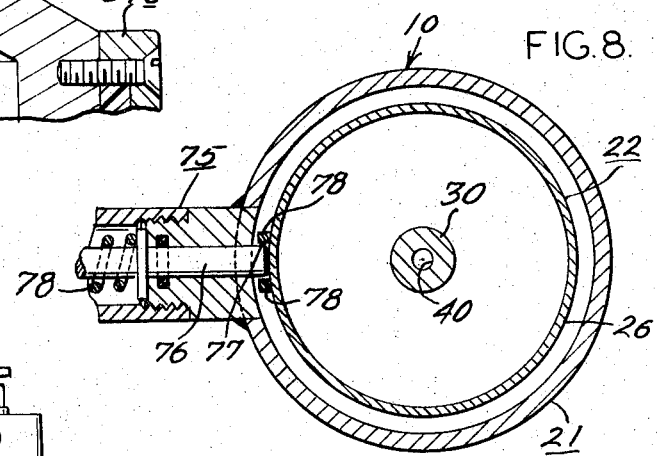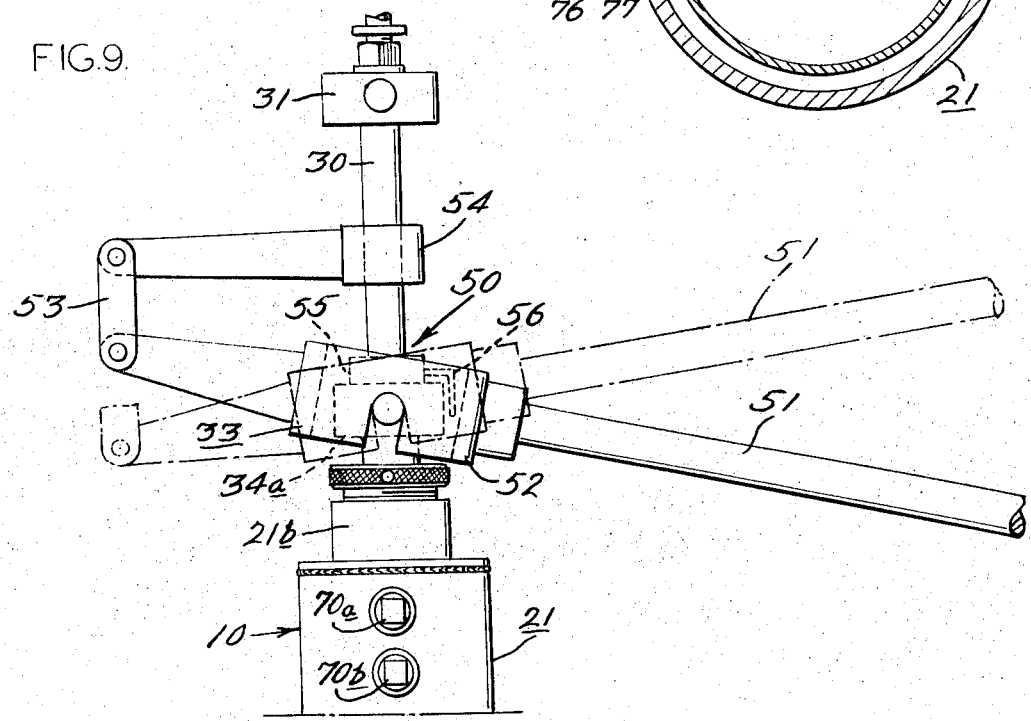

STOPPING APPARATUS FOR PIPE LINES

This is a continuation, of application Ser. No. 193,662 filed Oct. 29, 1971, now abandoned.

The present invention relates to flow control apparatus of the type which utilizes a bag capable of being inflated inside a pipe to block flow through the pipe.

In the normal course of distributing liquid and gaseous materials, such as natural gas, it sometimes becomes necessary for flow in a main pipe line to be blocked for a period of time so that repairs or like work may be performed on the line. Devices are available for this purpose, and examples of such devices which employ inflatable bags to block flow in pipes are disclosed in U.S. Pat. Nos. 1,860,855 and 1,946,138. Although these devices may operate satisfactorily to block flow through a pipe, they possess certain limitations. For example, neither device has any provision for avoiding the leakage of gas from the pipe while the device is being installed, since the devices are simply threaded into an exposed tapped hole in the side of the pipe. Moreover, with the patented devices, it is possible for the bag to become damaged by sharp metal edges around the tapped hole during insertion and withdrawal. Also there is an absence of suitable means for initially disposing the bag in proper operating relation with respect to the pipe during insertion and withdrawal.

In addition to the foregoing devices, other types of line-stoppers are available, and examples of such stoppers are disclosed in U.S. Pat. Nos. 2,811,985; 2,926,609; and 3,025,885. Although each of these stoppers possesses a certain degree of utility for its intended purpose, the stopper described in the first-mentioned patent utilizes a frangible container to insert its inflatable bag into a pipe. The container is jettisoned in the pipe when the bag is inflated, and when the normal flow is restored, the jettisoned fragments can cause blockage downstream in the line. The second and third of the above patented devices are operable only in conjunction with access fittings in a pipe line. Hence, these devices may not be employed in situations where it is desired to block flow at some remote field location where such fittings are not available.

Apart from the above-noted limitations of existing apparatus, a satisfactory line-stopper should be of lightweight but rugged construction, and it should be simple enough to be operated with ease by workmen possessing a minimum of special skills. The line-stopper should be compact when not in use so that a minimum of storage space is required. Furthermore, the line-stopper should possess a minimum of working parts in order to reduce its manufacturing and maintenance costs. Most importantly, the line-stopper should be capable of being installed without substantial leakage of gas.

With the foregoing in mind, it is the primary object of the present invention to provide an improved inflatable-bag type line-stopper which is capable of being used with the valving assembly of a conventional tapping machine to minimize leakage of gas during installation and removal of the line stopper.

It is another object of the present invention to provide a novel line-stopper of the inflatable-bag type which prevents the bag from being damaged during insertion and withdrawal and which facilitates disposition of the bag in proper operating relation in a pipe.

As a further object, the present invention provides a line-stopper which is safe to use, which is of lightweight but rugged construction, and which is relatively simple to operate.

It is a still further object of the present invention to provide a line-stopper which is capable of being arranged in a compact configuration to minimize storage space.

The line-stopper of the present invention comprises an upstanding housing which is adapted to mount onto the valving assembly of a conventional pipe-tapping machine and a bag insertion assembly mounted in the housing. The insertion assembly includes an insertion tube telescopically mounted in the housing, a plunger slidably mounted in the insertion tube, and an inflatable bag connected to the lower end of the plunger. Handle means are provided on operating rods which extend longitudinally in the housing and which are connected to the plunger and the insertion tube to enable the insertion tube to be extended and retracted with respect to the housing and to enable the plunger and bag to be extended and retracted with respect to the insertion tube. The bag is coupled to a source of pressure fluid through another valving mounted at the top of the plunger-operating-rod to enable the bag to be inflated and deflated when inside the pipe. The bag is provided with a rigid neck which is connected by means of a knuckle assembly to the plunger to ensure proper orientation of the bag in the pipe during insertion and to enable the bag to be pivoted in its insertion tube for facilitating insertion and withdrawal of the bag. The bag is withdrawn from inside the pipe with a minimum of effort by means of a jacking assembly which is mounted on the handle of the insertion-tube operating-rod and which is operatively associated with the plunger-operating-rod. There is provided means to releasably couple the operating rods to their associated elements to permit the line-stopper to be arranged in a compact storage configuration when the insertion tube and plunger are fully retracted into the housing and secured by means of a locking assembly.

These and other objects, features and advantages of the present invention should become apparent from the following description when taken in conjunction with the accompanying drawings in which:

FIG. 1 is an elevational view of a line-stopper which embodies the present invention, the view illustrating the line-stopper mounted on the valving assembly of a conventional pipe-tapping machine which is fastened to a section of pipe;

FIG. 1a is a sectional view taken along line 1a—1a of FIG. 1;

FIG. 2 is a longitudinal sectional view of the line-stopper of FIG. 1 with its bag-insertion assembly in a retracted position and the bag in a normally collapsed configuration therein;

FIG. 3 is a view similar to FIG. 2 but illustrating the line-stopper with its bag-insertion assembly in an extended position and the bag inflated in the pipe;

FIG. 4 is an enlarged sectional view of the upper portion of the line-stopper illustrated in FIG. 2;

FIG. 5 is an enlarged sectional view of the lower portion of the line-stopper illustrated in FIG. 3;

FIG. 6 is an enlarged sectional view taken along line 6—6 of FIG. 5 and looking downstream toward the bag inflated in the pipe;

FIG. 7 is a greatly enlarged sectional view taken along line 7—7 of FIG. 4;

FIG. 7a is a sectional view taken along line 7a—7a of FIG. 7;

FIG. 8 is an enlarged sectional view taken along line 8—8 of FIG. 3; and

FIG. 9 is an elevational view of a jacking assembly mounted on the upper portion of the line-stopper. e Referring now to the drawings, there is illustrated in FIG. 1 a line-stopper 10 embodying the present invention. In the illustrated embodiment, the line-stopper 10 is mounted on a valve assembly 11 which is associated with a conventional pipe-tapping machine (not shown). The valve assembly 11 is securely fastened in fluid-tight relation to a section of pipe 12 by means of chains 13, 13. As best seen in FIG. 2, the valve assembly 11 registers with a lateral port 14 which is tapped in the pipe 12 by a tapping assembly of the tapping machine so as to prevent gas from escaping from the pipe 12 after the port 14 is tapped. Preferably, the tapping machine is an R type machine manufactured by the Mueller Company of Decatur, Ill.; however, machines of other manufacturers may be used satisfactorily, as long as each possesses a valve assembly which provides a planar surface alongside the pipe 12 for mounting the line-stopper 10 and gate means 11a for exposing the port 14 to accept operating elements of the line-stopper 10.

The line-stopper 10 has two basic operating positions. In one position illustrated in FIG. 2, fluid flow is afforded through the pipe 12 when an inflatable bag 20 is contained inside the line-stopper 10. In another position, illustrated in FIG. 3, fluid flow in the pipe 12 is blocked when the bag 20 is inserted in the pipe 12 and inflated downstream of the port 14. In the present instance, the bag 20 is of nylon-reinforced neoprene construction, and when inflated to proper pressure, the bag 20 has a hemispheric surface 20a facing upstream, a cylindrical surface 20b engaging the inside of the pipe 12, and a hemispheric surface 20c facing downstream. If desired, the bag 20 may be of a rubber-impregnated fabric construction which provides a durable yet flexible and inflatable structure capable of withstanding the internal pressure required to block flow in the pipe 12; however, the above-noted nylon-reinforced bag construction has performed satisfactorily in actual usage.

In accordance with the present invention, the bag 20 is inserted into and withdrawn from the pipe 12 in a manner which minimizes the possibility of damage to the bag. To this end, the line-stopper 10 comprises an upstanding housing 21 and a bag-insertion assembly 22 mounted to slide longitudinally inside the housing 21 between a retracted position illustrated in FIG. 2 and an extended position illustrated in FIG. 3. The housing 21 is in the form of a hollow elongated cylinder and has an enlarged base 23 which surrounds its lower end 21a and which mounts onto the valve assembly 11. In the present instance, the housing 21 is secured to the valve assembly 11 by means of two pairs of ears 24, 24 (FIG. 1a) which extend diametrically outward from the base 23 and which are clamped to the valve assembly 11 by means of bolts 25, 25. The bag-insertion assembly 22 comprises a hollow elongated insertion tube 26 and a plunger 27. The plunger 27 is mounted to slide longitudinally inside the tube 26, and the plunger 27 has a lower end 27a which is connected to the bag 20 so that the bag 20 is pushed from the insertion tube 26 ahead of the plunger 27. With this structure, contact and possible abrasion between the bag 20 and the edge of the port 14 is avoided because of the interposition of the tube 26 between the edge of the port 14 and the bag 20. As best seen in FIGS. 3, 4 and 5, the lower end of the insertion tube 26 is threaded at 26c to mate with the threads in the port 14 for preventing them from being damaged due to lateral loads on the insertion tube 26 caused by pressure on the bag 20. Thus, when the plunger 27 is displaced downwardly relative to the insertion tube 26, the bag 20 is ejected from the insertion tube 26 without contacting the edge of the port 14.

For the purpose of telescoping the insertion tube 26 relative to the housing 21 and for the purpose of displacing the plunger 27 relative to the insertion tube 26, operating means is provided. As best seen in FIG. 2, the operating means for the plunger 27 includes an elongated rod 30 connected to the upper end 27b of the plunger 27 and extending longitudinally through the housing 21. The rod 30 is discontinuous and has a relatively short length extending through the plunger 27 and a longer length extending upwardly beyond the plunger 27 and sealingly coupled in the plunger-endwall 27b by means of an O-ring 30a (FIGS. 4 and 5) to prevent leakage of inflation air. The rod 30 projects upwardly beyond the upper end 21b of the housing 21, and a handle 31 with diametrically extending grips is fastened to the upper end of the rod 30. The operating means for the insertion tube 26 includes an operating rod 32 connected to an endwall 26a of the insertion tube 26. Like the plunger-operating-rod 30, the insertion-tube-operating-rod 32 extends longitudinally in the housing 21 and projects beyond the upper end 21b of the housing 21. A handle 33, similar to the handle 31, is fastened to the upper end of the rod 32. As best seen in FIG. 4, the insertion-tube-operating-rod 32 is hollow and slidably receives the plunger-operating-rod 30. A packing gland 34a provides a pressure-tight sliding connecting between the plunger rod 30 and the insertion rod 32, and a packing gland 34b on the upper end 21b of the housing provides a similar connection for the insertion tube rod 32.

When the line-stopper 10 is in its flow-affording position, as seen in FIG. 2, the handles 31 and 33 are spaced vertically from one another with the handle 31 of the plunger-operating-rod 30 being located above the handle 33 of the insertion-tube operating-rod 32. Both handles are normally aligned with the pipe 12. In order to insert the bag 20 in the pipe 12, the lower or insertion-tube operating-rod handle 33 is displaced downwardly and rotated to extend the insertion tube 26 and to screw it into the port 14. The bag 20 is ejected from the insertion tube 26 when the upper or plunger-operating-rod handle 31 is displaced downwardly. The bag 20 is withdrawn from the pipe 12 when this procedure is reversed.

During insertion and withdrawal, the bag 20 moves between a deflated position normal to the pipe 12 when the bag 20 is in its insertion tube 26 (FIG. 2) and a position coaxial with the pipe 12 when the bag 20 is inflated and in operating relation in the pipe 12 (FIG. 3). In order to enable the bag 20 to be moved readily between these positions, there is provided means to couple the bag 20 to the plunger 27 in a manner which enables a workman to control the movement of the bag 20 during insertion and withdrawal. To this end, a knuckle assembly 35 (FIG. 3) cooperates with a rigid cylindrical neck 36 mounted in the bag 20 to provide an axis transverse to the path of movement of the bag 20 about which the bag 20 can pivot; however, the neck 36 of the bag 20 is otherwise rigidly coupled to the knuckle assembly 35 so that the bag 20 can be twisted inside its insertion tube 26.

In the present instance, as best seen in FIGS. 5 and 7, the bag 20 is fabricated with a reduced-diameter portion 20d, and the neck 36 matingly engages inside the reduced-diameter portion 20d of the bag 20. A collar 34 with an inturned peripheral flange 34c engages the outside of the reduced portion 20d of the bag 20 and is fastened as by suitable threaded fasteners to ensure a positive non-slip mounting of the bag 20 to the neck 36 and to protect the bag-neck against possible abrasion. In order to mount the neck 36 to the plunger 27, the neck 36 has a tongue 37 which extends into a bifurcated extension 38 on the lower end of the plunger 27. As illustrated in FIG. 7, pivotal action between the plunger-extension 38 and the bag-neck 36 is provided by means of a pivot pin 39 which extends through the neck 36 and across the bifurcated extension and which is fastened in place by means of a snap-ring 41. With this structure, the handle 31 can be pivoted in opposite directions during insertion and withdrawal to reduce frictional forces between the bag 20 and the insertion tube 26, which forces otherwise would tend to retard movement of the bag 20 and increase the effort required to insert and withdraw the bag.

After the bag 20 is inserted in the pipe 12, it is inflated when it is desired to block fluid flow, and it is deflated when it is desired to afford fluid flow. To this end, the bag 20 is coupled to a source of pressure fluid, such as compressed air, by means of a passage or conduit 40, which extends longitudinally in the plunger-operating-rod 30 and which is connected at its lower end to the bag 20 and which is connected at its upper end to a supply of compressed air through an assembly 43 of valves and gauges (FIG. 1). As best seen in FIGS. 7 and 7a, the lower end of the passage 40 is connected to the bag 20 by means of a flexible hose 44, one end of which mounts onto a cubical extension 42 on the right-hand end of the pivot pin 39. The extension 42 is fastened to and secured against rotation relative to the right-hand bifurcation of the plunger-extension 38, and the extension 42 and pivot pin 39 are bored axially and radially to provide a passage 40a therein. The pivot pin 39 has a centrally located peripheral groove 40b which communicates with a longitudinally extending passageway 40c in the tongue 37 of the bag 20. A pair of O-rings 45, 45 are located outboard of the groove 40b and sealingly engage the pin-receiving bore in the tongue 37. Thus, compressed air can be supplied to and vented from the bag 20 irrespective of the angular position of the bag with respect to its plunger 27.

The valve assembly 43 has two valves 43a and 43b, the valve 43a operating to supply compressed air to the bag 20 and the valve 43b operating to vent air from inside the bag 20. A gauge 43c indicates the pressure in the bag 20 through the passage 40. A gauge 44 is provided on the upper portion of the housing to indicate the pressure in the pipe 12 through the gate valve assembly 11 and a cylindrical passage surrounding the insertion tube 26 in the housing 21. Thus, upon proper manipulation of the valves 43a and 43b, a workman may adjust the pressure in the bag 20 to ensure that the bag 20 contains sufficient pressure to block flow through the pipe 12. Sufficient pressure is ensured if the pressure is adjusted to a magnitude of about 20 psig greater than the pressure in the pipe 12. Thus, for a line pressure of 15 psig, the pressure in the bag 20 should be about 35 psig.

In order to assist in unfolding the bag 20 during insertion and to ensure disposition of the bag 20 downstream of the port 14, there is provided a vane 46 (FIG. 3) on the lower end of the insertion tube 26. As best seen in FIGS. 5 and 6, the vane 46 depends into the pipe 12 and terminates substantially centrally thereof. The vane 46 is curved in the horizontal plane and surrounds a major portion of the plunger-extension 38, and the vane 46 has a trailing edge which tapers upwardly in a direction downstream from its lowermost terminus. The vane 46 depends a sufficient distance into the pipe 12 to ensure that the knuckle assembly 35 causes the bag 20 to turn downstream of the port 14 when the bag 20 is ejected from its insertion tube 26.

The bag 20 is lubricated before insertion to reduce the effort required for insertion and withdrawal. Any of a number of lubricants may be used for this purpose, and although a tapping grease composed of beeswax and petroleum is satisfactory, a lubricant sold as Murphy's Oil Soap is preferred. In situations where the bag 20 is not properly lubricated, it may be necessary for a considerable amount of tension to be applied to the plunger-operating-rod 30 to retract the bag 20.

According to the present invention, the bag 20 is capable of being withdrawn from the pipe 12 with a minimum of effort. To this end, a jacking assembly 50 is provided to enable a workman to apply the required tension to the operating rod 30 for withdrawing the bag 20. As best seen in FIG. 9, the jacking assembly 50 is mounted on the handle 33 of the insertion tube rod 32 and is associated with the plunger-operating-rod 30 so as to displace the rod 30 upwardly in increments upon pivotal up and down movement of a handle 51. In the illustrated embodiment, the jacking assembly 50 has a collar 52 which threadedly mounts the handle 51 and which is supported to pivot on a fulcrum provided by the lower operating handle 33. The collar 52 is connected through a linkage 53 to a friction grip 54 which engages the plunger-operating-rod 30 above the collar 52, and a latch 55 is provided to engage the operating rod 30 for preventing slippage of the rod 30 in the downward direction when the handle is being displaced upwardly during jacking. As best seen in FIG. 4, the latch 55 has an offset web 56 with a downwardly concave recess 57 which web engages the hand grip of the lower operating handle when the jacking assembly 50 is in use. When the jacking assembly 50 is not in use, the latch 55 is rotated 90° in a plane normal to the operating rod 30 to engage the top of the upper packing gland 34a. With this structure, reciprocation of the handle 51 between the positions illustrated in full and broken lines in FIG. 9 causes the plunger operating rod 30 to be displaced upwardly in increments and the bag 20 to be retracted into its insertion tube 26.

The line stopper 10 is capable of being arranged in a compact storage configuration when not in use. To this end, the insertion tube 26 is capable of being completely retracted into the housing 21 and the operating rods 30 and 32 and their handles 31 and 33 are capable of being disconnected from their associated operating elements. As best seen in FIG. 4, the insertion tube 26 is secured in its retracted position by means of a locking assembly 60 which is mounted on the outside of the housing 21 adjacent its upper end 21b. The locking assembly 60 includes a pin 61 engaging in a lateral bore 62 in the endwall of the plunger 27, and in the illustrated embodiment, the pin 61 is biased into engagement in the bore 62 by means of a compression spring 63 which engages between a shoulder 64 on the pin 61 and an inside wall 65 of a housing around the locking assembly 60. An operator 66 is provided to permit the pin 61 to be disengaged from the bore 62 to permit the insertion tube 20 to be displaced axially upwardly and downwardly when in use. A conventional bayonet-type connection permits the pin 61 to be maintained disengaged from the bore 62. With this structure, the endwall 26a of the insertion tube 26 is engaged between the endwall 27b of the plunger 27 and the endwall of the housing 21, thereby maintaining the insertion tube 26 in its retracted position.

The operating rods 30 and 32 are releasably fastened to their associated operating elements to enable them to be disconnected for storage. For this purpose, the endwall 26a of the insertion tube 26 threadedly receives a dog or set screw 70 which engages in a lateral recess 71 at the lower end of the insertion-tube operating-rod 32. Similarly, the endwall 27b of the plunger 27 threadedly receives a like dog 72 which engages in a lateral recess 73 adjacent the lower end of the plunger-operating-rod 30. The dogs 70 and 72 are accessible from outside the housing 21 through plugged bosses 70a and 70b, respectively. The bosses are of sufficient size to permit a wrench (not shown) to be inserted into the housing 21 and engaged with the dogs 70 and 72 for rotating them. Thus, the operating rods 30 and 32 may be readily connected to and disconnected from their associated operating elements.

As noted heretofore, it may sometimes be necessary for the workman to twist the bag 20 in alternate directions relative to its insertion tube 26 while the bag 20 is being displaced axially during insertion and withdrawal. When the bag 20 is pivoted, there is a tendency for its insertion tube 26 to pivot with it. In order to counteract the pivotal movement of the insertion tube 26, an anti-pivot assembly 75 is provided on the upper end 21b of the housing 21 below the locking assembly 60 (FIG. 3). As best seen in FIGS. 4 and 8, the anti-pivot assembly 75 includes a pin 76 which engages in an elongated channel 77 provided between a pair of closely spaced longitudinally extending flanges 78, 78 on the outside of the upper end of the insertion tube 26. Like the locking assembly 60, the pin 76 of the anti-pivot assembly 75 is biased into the channel 77 by means of a compression spring 78. An operator 80 is provided to displace the pin 76 in alternate directions, and a conventional bayonet-type connection is provided for maintaining the pin 76 spaced from the insertion tube 26 when its anti-pivot function is not needed, for example, when the insertion tube 26 is retracted as illustrated in FIG. 4. In use, the pin 76 is engaged in the channel 77 between the insertion-tube flanges 78, 78 when the insertion tube 26 is in its extended position as seen in FIG. 3. Thus, the bag 20 can be twisted inside its insertion tube 26 without causing the insertion tube 26 to pivot relative to the housing 21.

It is noted that the flanges 78, 78 are located on the insertion tube 26 in such a manner as to cause the vane 46 to be properly oriented upstream of the port 14 in the pipe 12. Furthermore, it is noted that the lower operating handle 33 on the operating rod 32 of the insertion tube 26 is mounted so as to be aligned with the pipe 12 when the anti-pivot assembly 75 is engaged. Thus, there is provided an exterior indication of the position of the vane 46 and hence bag 20 in the pipe 12.

In order to protect the locking and anti-pivot assemblies from being damaged and to prevent inadvertent actuation of the locking assemblies 60 and 75 during transportation, a guard 90 is welded to the upper end 21b of the housing 21. As illustrated in FIGS. 1-3, the guard 90 surrounds the assemblies 60 and 75 and extends away from the surface of the housing 21. The guard also protects the gauge 44 from damage. In addition, a handle 91 is provided on the upper end 21b of the housing 21, and handles 92 and 92 are provided adjacent its lower end 21a to enable workmen to maneuver the line stopper 10 into and out of operating relation with the valve assembly 11. Preferably, the linestopper 10 is fabricated of steel; however, lightweight materials, such as aluminum, magnesium, or the like, may be preferred where a line-stopper of less weight is desired.

In using the line-stopper 10, the tapping machine valve assembly 11 is first installed on the pipe 12, and the port 14 is tapped with the tapping machine in the conventional manner. The operating rods 30 and 32 are connected to the plunger 27 and insertion tube 26, respectively, when a wrench (not shown) is inserted through the bosses 70a and 70b and the dogs 70 and 72 are rotated in the proper directions. The line-stopper 10 is then mounted on the valving assembly 11 and is secured when the bolts 25, 25 are tightened. Preferably, the bag 20 is lubricated with one of the aforementioned lubricants when initially installed in its insertion; tube 26. The valve and gauge assembly 43 is then connected to a source of compressed air through suitable piping, and the line-stopper 10 is in the ready position illustrated in FIG. 2.

In order to block flow in the pipe 12, a small by-pass valve (not shown) associated with the gate valve is opened to equalize pressure between the housing and the pipe to permit the gate 11a on the valving assembly 11 to be opened. The locking assembly 60 is operated to release the insertion tube 26 and plunger 27 from their retracted positions. The lower operating handle 33 is displaced downwardly to cause the insertion tube 26 to enter the port 14 in the pipe 12, and the handle 33 is rotated to screw the insertion tube 26 into the pipe. The anti-pivot assembly 75 is thereafter engaged to secure the insertion tube 26 against pivotal movement with respect to the housing 21, and to align the lower handle 33 with the pipe 12. The bag 20 is inserted when the upper operating handle 31 is depressed to cause the plunger 27 to be displaced downwardly in the insertion tube 26.

After the bag 20 is fully inserted in the pipe 12 as indicated when the upper handle 31 bottoms against the lower handle 33, the air valve 43a is opened and compressed air is supplied to the bag 20. As noted heretofore, a workman adjusts the pressure in the bag 20 until the pressure reading on the gauge 43c is about 20 psi greater than the pressure reading on the gauge 44. When the pressure is so adjusted, flow through the pipe 12 is blocked and repairs or like work may be performed downstream of the line-stopper 10.

In removing the bag 20 from the pipe 12, the foregoing procedure is essentially reversed except for some notable variations. For instance, the bag 20 is deflated when the air valve 43a is closed and the vent valve 43b is opened to vent the bag 20 to atmosphere. The upper handle 31 is then raised to its upper limit position and the bag 20 is retracted into its insertion tube 26. If necessary, the jacking assembly 50 may be used to retract the bag as described heretofore. The lower handle 33 is then raised to its upper limit position, at which position the endwall of the insertion tube 26 engages the endwall of the housing 21 as illustrated in FIG. 4. The upper handle 31 may then be displaced further upward to cause the recess 62 in the endwall of the plunger 27 to register with and to be engaged by the pin 61 of the locking assembly 60. The gate valve is closed and the operating rods 30 and 32 are then disconnected from their respective operating elements. The line stopper is then removed from the valving assembly 11 for storage. The tapped port 14 in the pipe is plugged in the customary manner, and the valving assembly 11 removed.

In view of the foregoing, it should be apparent that an improved line-stopper has now been provided. The line-stopper is capable of being operated safely by workmen possessing a minimum of special skills. Moreover, the line-stopper is of simple yet rugged construction and possesses a minimum of operating parts.

While a preferred embodiment of the present invention has been described in detail, various modifications, alterations and changes may be made without departing from the spirit and scope of the present invention as defined in the appended claims.

We claim:

1. A line-stopper comprising: an inflatable bag having a normally collapsed configuration permitting insertion and withdrawal through a lateral port in a pipe and having an expanded configuration for engaging the inside of the pipe to block fluid flow therethrough, a hollow elongated insertion tube slidably receiving the bag in its collapsed configuration, a plunger slidably contained in said insertion tube, means connected to one end of said plunger to displace the plunger in opposite directions in the tube for inserting and withdrawing said bag, means providing a rigid extension on said bag, knuckle means coupling said rigid extension to the other end of the plunger and mounting said extension to pivot on an axis transverse to the path of movement of the plunger between one position coaxial with the insertion tube when said bag is collapsed and said knuckle means is in said insertion tube and another position aligned with the pipe when the knuckle means is in the pipe and the bag is disposed inside the pipe, and means providing fluid communication through said knuckle means between said bag and a source of pressure fluid, whereby the bag may be inserted in proper operating relation with respect to the pipe upon axial movement of the plunger relative to the insertion tube.

2. Apparatus according to claim 1 wherein said knuckle means includes means providing a bifurcated extension on said one end of the plunger, tongue means on said rigid neck of said bag engaging said bifurcated extension, and a pivot pin extending through said extension and tongue to mount said tongue to pivot relative to said extension, said fluid communication means including means providing a passage in said tongue and said pin for admitting and exhausting said pressure fluid with respect to said bag.

3. Apparatus according to claim 2 wherein said passage means includes a peripheral groove in said pin, a passageway in said tongue in registry with said groove, and means providing rotary seals outboard of said groove to permit said tongue to pivot relative to said pin and to cause said passageway to register with said groove for providing a continuous connection between said bag and said source of pressure fluid irrespective of the angular position of the bag relative to its plunger.

4. Apparatus according to claim 1 wherein said bag has a flexible peripheral portion engagable against the interior of the pipe and said rigid extension is located between said peripheral portion and said pivot axis to space said peripheral portion of the bag from the port in the pipe when the bag is inflated.

5. Apparatus according to claim 4 wherein the peripheral portion of the bag has a predetermined inflated dimension transverse to the pipe and said rigid extension has a dimension less than said predetermined dimension for permitting said extension to pivot relative to the plunger when said pivot axis is located adjacent said port during insertion and withdrawal of the bag.

6. In a line-stopper assembly, including an inflatable bag having a normally collapsed configuration permitting insertion and withdrawal through a lateral port in a pipe and having an expanded configuration for engaging the inside of the pipe to block fluid flow therethrough, a hollow elongated insertion tube slidably receiving the bag in its collapsed configuration, a plunger slidably mounted in said insertion tube, means connected to one end of said plunger to displace the plunger in opposite directions in the tube for inserting and withdrawing said bag, and means providing fluid communication between said bag and a source of pressure fluid, the improvement comprising: a housing surrounding said insertion tube for slidably containing said insertion tube, means for displacing said insertion tube axially relative to said housing between extended and retracted positions, means for mounting said housing in registry with said port, knuckle means connecting said bag to the other end of said plunger for permitting said bag to pivot about an axis transverse to said insertion tube between a storage position coaxial with said insertion tube when said knuckle means is in said insertion tube and an operating position aligned with said pipe when said knuckle means is in said pipe upon displacement of said plunger axially in said insertion tube, and passage means in said knuckle means for providing said fluid communication between said bag and said source of pressure fluid, said knuckle means cooperating with said plunger and said bag to enable said bag to become disposed downstream of said insertion tube when said bag is inflated in said pipe.

7. Apparatus according to claim 6 including valving means mounted to said pipe adjacent said port and providing a mounting surface alongside said pipe for receiving said housing and wherein said housing-mounting means includes means releasably securing said housing to said surface so that fluid communication is provided between said housing and said pipe when said valving means is opened and said insertion tube may be inserted through said valving means and into pipe through said port.

8. Apparatus according to claim 7 wherein said housing-mounting means includes a base on said housing having ears extending outwardly in opposite directions and threaded fastener means releasably coupling said ears to said mounting surface for providing a fluid-tight connection between the housing and the mounting surface.

9. Apparatus according to claim 6 including first handle means connected to said plunger-displacing means for pivoting said plunger in said insertion tube and anti-pivot means carried by said housing for cooperating with said insertion tube to limit pivotal movement of said insertion tube relative to said housing when said plunger is pivoted in said insertion tube during insertion and withdrawal of said bag.

10. Apparatus according to claim 9 wherein said plunger-displacing means includes a first rod extending longitudinally in said insertion tube with one end extending outside of said housing, said insertion tube having a transverse end wall slidably and pivotally receiving said rod, said first handle means being connected to said first rod outside of said housing, said insertion-tube displacing means including a second rod connected at one end to an endwall of said insertion tube and having its other end extending outside of said housing, and second handle means connected to said second rod outside of said housing for displacing said second rod, whereby the bag and its insertion tube may be displaced into and out of said pipe upon displacement of said first and second handle means.

11. Apparatus according to claim 10 including means providing access to the interior of said housing adjacent one end thereof, first means releasably coupling said first rod to said plunger and second means releasably coupling said second rod to said insertion tube, said first and second releasable coupling means being accessible through said access means for connecting and disconnecting said rods.

12. Apparatus according to claim 6 including curved vane means depending from one end of said insertion tube for cooperating with the knuckle means to guide the bag into proper operating relation in the pipe.

13. Apparatus according to claim 6 including locking means carried by said housing for engaging said insertion tube to releasably secure said insertion tube in a retracted position for arranging said line-stopper in a compact storage configuration.

14. Apparatus according to claim 6 wherein said bag has a flexible peripheral portion engagable against the interior of the pipe and including means carried by said bag and extending between said peripheral portion and said pivot axis for spacing said peripheral portion from said port when said bag is inflated in the pipe.

15. Apparatus according to claim 14 wherein said extending means includes a rigid element having a dimension between said axis and said bag short enough to permit pivoting about said axis when said knuckle means is located in proximity with said port during insertion and withdrawal of said bag.

16. In a line-stopper, including an inflatable bag having a normally collapsed configuration permitting insertion and withdrawal through a lateral port in a pipe and having an expanded configuration for engaging the inside of the pipe to block fluid flow therethrough, a hollow elongated insertion tube slidably receiving the bag in its collapsed configuration, a plunger slidably mounted in said insertion tube and connected at one end to said bag, means connected to the other end of said plunger to displace the plunger in opposite directions in the tube for inserting and withdrawing said bag, and means providing fluid communication between said bag and a source of pressure fluid, the improvement comprising: jacking means operatively associated with said plunger-displacing means, said jacking means including means providing a fulcrum about an axis transverse to the path of movement of the plunger-displacing means, a lever mounted to pivot on said fulcrum, grip means releasably engaging said plunger-displacing means, linkage means connecting said grip means to said lever for moving said plunger-displacing means axially in the insertion tube when the lever is pivoted in one direction, and anti-slip means cooperating with said plunger-displacing means for releasably engaging said plunger-displacing means to prevent movement thereof in a direction opposite said one direction during jacking.

* * * * *